D. R. BROWN.
OIL PUMP OPERATING MECHANISM.
APPLICATION FILED APR. 26, 1919.

1,339,097.

Patented May 4, 1920.

Inventor,
Douglas R. Brown,
By
Attorney

UNITED STATES PATENT OFFICE.

DOUGLAS R. BROWN, OF COFFEYVILLE, KANSAS.

OIL-PUMP-OPERATING MECHANISM.

1,339,097.  Specification of Letters Patent.  Patented May 4, 1920.

Application filed April 26, 1919. Serial No. 292,851.

*To all whom it may concern:*

Be it known that I, DOUGLAS R. BROWN, a citizen of the United States of America, and resident of Coffeyville, in the county of Montgomery and State of Kansas, have invented certain new and useful Improvements in Oil-Pump-Operating Mechanism, of which the following is a specification.

This invention relates to oil pump operating mechanism and particularly to means by which oil wells may be operated by radiating rods extending from a central power plant, the said invention having for its object the provision of novel means whereby a motor may be utilized for driving the gearing, the said invention including a casing, a worm wheel mounted therein, said worm wheel carrying an eccentric to which the pull rods or rod lines of oil pumps are connected, means being provided for mounting a worm within the casing for actuating the worm wheel so that the pumping operation will be carried on through power derived from a motor and the speed of operation may be controlled.

A further object of this invention is to provide a casing for the worm to insure lubrication of the engaging surfaces of the worm and worm wheel without requiring undue attention or oiling of these parts.

A still further object of this invention is to provide a worm shaft having a clutch thereon or driving shaft from the motor to the worm shaft including a flexible coupling.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
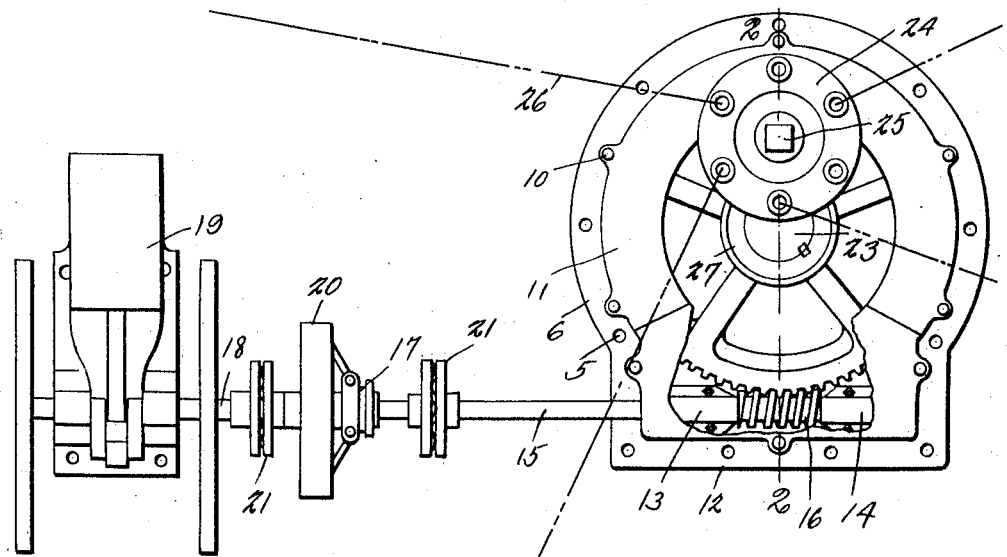
Figure 2:
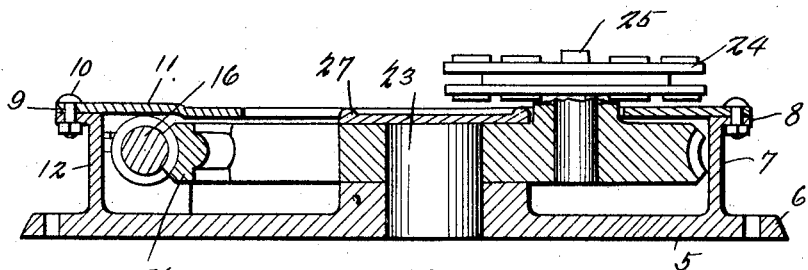

Figure 1 illustrates a plan view of a pumping mechanism embodying the invention, the casing of the pumping mechanism being broken away to show the interior thereof; and Fig. 2 illustrates a sectional view on the line 2—2 of Fig. 1.

In these drawings 5 denotes a base with an apertured flange 6, by which the base may be anchored to any suitable support and the said base has a cylindrical side wall 7 terminating in an outwardly extending flange 8.

The flange 8 has a plurality of apertures 9 for the reception of fastenings such as bolts 10 by which a plate 11 is secured on the base.

The base has a projecting portion 12 in which journal bearings 13 and 14 are anchored, the said journal bearings constituting supports for the worm shaft 15 and the said worm shaft has a worm 16 thereon at a point between the said bearings.

In the present embodiment of the invention, the worm shaft has one member 17 of a clutch thereon whereas the drive shaft 18 of the motor 19 drives the clutch member 20 by which motion is communicated to the worm shaft. Flexible couplings 21 are also interposed between a worm 16 and the motor so that provision is made for starting the pumping operations without undue jar or vibration to the machinery.

A worm wheel 22 engages the worm 16 and the said worm wheel is mounted on a stub shaft 23 centrally or approximately centrally of the base so that the worm wheel is driven by the worm. A wheel 24 is mounted eccentrically of the worm wheel and is free to rotate on a stub 25 carried by the worm wheel. Rods 26 are connected to the wheel 24 and are intended to radiate to pumping jacks of oil wells so that as the worm wheel rotates, the said rods are pulled and released thus making it possible to operate oil pumping jacks at a uniform speed without a jerking action. The worm at its engagement with the worm wheel as well as the extended portion of the base has a face plate or cover 27 secured to the flange of the side of the base and therefore the gearing is protected and lubricant such as hard grease may be held in the space occupied by the worm to insure proper lubrication of the machinery.

The clutch and flexible coupling may be of any of the well known types and they need not, it is thought, be further shown in detail.

In the present invention belting from the motor is eliminated and I am able to directly connect the crank shaft of the motor with the worm through instrumentalities which will insure smooth running and the gearing will operate in an inclosed case filled with grease so that proper lubrication will be insured. By the use of this invention furthermore, no speed reducing means between the motor and the driven parts is necessary since the direct worm driving means makes it possible, as stated, to regulate the speed by a control of the motor and thus expensive speed reducing mechanism may be eliminated.

I claim—

In a pump operating mechanism, a base having a side wall, a plate resting on the side wall for partially inclosing the interior of the base and having a clearance for the travel of a wrist pin, a worm wheel rotatably mounted in the base, a stub shaft carried by the worm wheel, an apertured wheel rotatable on the stub shaft, a worm shaft journaled in the base engaging the worm wheel, and means for driving the worm shaft.

DOUGLAS R. BROWN.